United States Patent [19]

Weythman

[11] 4,128,830
[45] Dec. 5, 1978

[54] APPARATUS FOR PROVIDING A COMPENSATION SIGNAL FOR INDIVIDUAL LIGHT SENSORS ARRANGED IN A PREDETERMINED RELATION

[75] Inventor: Gayle A. Weythman, Longmont, Colo.

[73] Assignee: International Business Machines Corporation, Armonk, N.Y.

[21] Appl. No.: 836,881

[22] Filed: Sep. 26, 1977

[51] Int. Cl.$^2$ .............................................. G06K 9/12
[52] U.S. Cl. ........................... 340/146.3 AG; 358/282
[58] Field of Search .............. 340/146.3 AG, 146.3 H; 358/282, 284, 80

[56] References Cited

U.S. PATENT DOCUMENTS

| | | | |
|---|---|---|---|
| 3,784,981 | 1/1974 | Borowski, Jr. et al. | 358/282 |
| 3,800,078 | 3/1974 | Cochran et al. | 340/146.3 AG |
| 3,830,972 | 8/1974 | McHugh et al. | 358/282 |
| 3,872,434 | 3/1975 | Duvall et al. | 340/146.3 AG |
| 3,961,132 | 6/1976 | Landsman | 358/282 |
| 3,962,681 | 6/1976 | Requa et al. | 340/146.3 AG |
| 4,001,500 | 1/1977 | Lavery et al. | 358/282 |
| 4,058,828 | 11/1977 | Ladd | 358/80 |

Primary Examiner—Leo H. Boudreau
Attorney, Agent, or Firm—Frank C. Leach, Jr.

[57] ABSTRACT

The dark scan noise level produced from each of a solid state array of light sensors is obtained by preventing light from being received by each of the light sensors for a predetermined period of time. This signal is converted into a digital signal and stored in a shift register. When each of the light sensors of the array is subjected to light, the output signal produced thereby is reduced by the stored noise signal for the same light sensor. These output signals from the light sensors can be converted to digital signals and have the noise correction signals from the shift register subtracted therefrom by a digital subtractor, which is a complementary adder, or the digital noise correction signals from the shift register can be converted to analog signals and subtracted from the output signals of the light sensors of the array in an analog subtractor. The noise correction signals from the shift register are recirculated to the shift register during supply to the subtractor.

7 Claims, 9 Drawing Figures

APPARATUS FOR PROVIDING A COMPENSATION SIGNAL FOR INDIVIDUAL LIGHT SENSORS ARRANGED IN A PREDETERMINED RELATION

When scanning an illuminated area such as a document, for example, by light sensors, it is desired to be able to obtain signals with as low an amplitude as possible. Otherwise, a light sensor may indicate that it has received some light when it has received no light because of the noise level.

Therefore, in sensing the level or quantity of light by an array of light sensors such as solid state photodiodes, for example, it is desired that the dynamic range, which is the ratio of the saturation light signal level to the minimum light signal detectable above the background noise level, be as high as possible to obtain the various levels of light received by the various light sensors of the array. Thus, an increase in the dynamic range enables more accurate sensing of the differences in light levels received by the various light sensors of the array.

There are basically three types of noise associated with solid state light sensing arrays operating in the charge storage mode. There are the integrated dark leakage current, the fixed pattern noise, and the thermal dynamic noise.

The dark leakage current for each cell, which comprises a photodiode and a storage capacitor in parallel, is generally understood and is due to the loss of charge from the capacitor at all times. Thus, for a given period of time, the dark leakage current for each specific light sensor is a constant in a given environment. While the dark leakage current can change with operating temperature, it does not change in a given environment.

The fixed pattern noise is produced by the clock switching transients. These are capacitively coupled into the output signals. This is due to the close proximity of the clock lines to the output line on the integrated chip having the light sensors and the fast switching of the clock signals on the clock lines. That is, each of the cells is clocked sequentially as to when it starts to receive the light and when the signal is obtained therefrom.

The fixed pattern noise for each specific light sensor remains relatively constant for a given system. It does not change with operating temperature as the dark leakage current does.

The present invention extends the dynamic range of an array of light sensors by dynamically compensating the output signal from each of the light sensors to remove the noise produced by the dark leakage current and the clock switching transients. By removing these two noises from each of the output signals of each of the light sensors of an array, the usable sensitivity of the array of light sensors at the dark end is increased. Thus, the minimum light signal detectable above the background noise level is much smaller when using the present invention than has been previously available.

The present invention removes the fixed pattern noise and the dark leakage current noise from each of the output signals from each of the light sensors. The present invention accomplishes this through activating the array of light sensors while preventing any light from reaching them. Thus, each of the light sensors produce only the noises associated with the clock switching transients and the dark leakage current in the given environment. These noises for each of the light sensors are obtained separately.

The present invention stores the signal produced by these two noises for each light sensor in suitable storage means. Then, when the light sensors of the array are exposed to light, the stored signal for the same light sensor is subtracted from the output signal of the light sensor. As a result, the output signal is compensated for both the noise produced by the dark leakage current and the noise produced by the clock switching transients. Therefore, a much lower minimum light signal is detectable by using the present invention.

An object of this invention is to provide an and apparatus for increasing the useful dynamic range of light sensors arranged in a predetermined relation.

Another object of this invention is to provide an apparatus for reducing the background noise level of light sensors arranged in a predetermined relation.

A further object of this invention is to provide apparatus for enabling light sensors arranged in a predetermined relation to produce detectable signals of smaller amplitude.

The foregoing and other objects, features, and advantages of the invention will be apparent from the following more particular description of the preferred embodiments of the invention as illustrated in the accompanying drawings.

Figure 1:
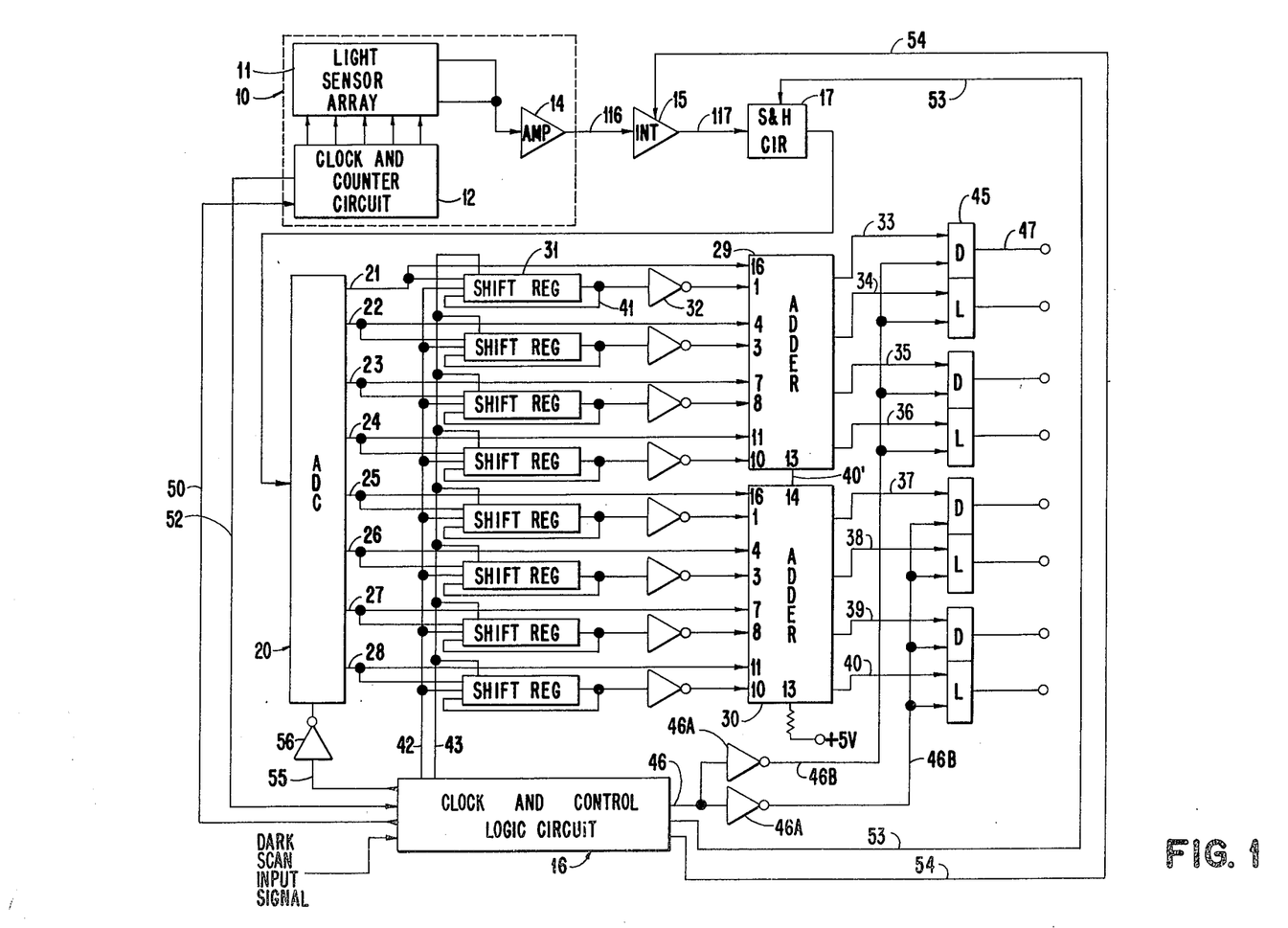
FIG. 1 is a schematic block diagram of one embodiment of the apparatus for dynamically compensating individual light sensors of an array for dark scan noise.

Referring to the drawings and particularly FIG. 1, there is shown a scanner 10, which includes an array 11 of light sensors. One suitable example of the array 11 of light sensors is sold by Reticon Corporation, Mountain View, Calif. as model RL 1024C, which has silicon photodiodes as the light sensors with the silicon photodiodes arranged in a high density monolithic linear array. The array 11 is mounted so that each of the photodiodes receives the light from a specific area for a predetermined period of time, which is the same for each of the photodiodes. The Reticon model RL 1024C is more specifically shown and described in a Reticon publication, copyrighted 1974 and identified as 47014.

To control the period of time that each of the photodiodes of the array 11 receives the light, a clock and counter circuit 12 is connected to the array 11. When the array 11 is Reticon model RL 1024C, the clock and counter circuit 12 includes a clock and counter sold as model RC400 by Reticon Corporation and a driver/amplifier sold as model RC408 by Reticon Corporation. The Reticon RC400 clock and counter board supplies four clock phases to the array 11 to control the predetermined period of time during which each of the photodiodes of the array 11 receives light.

The four clock phases are supplied to two separate shift registers with each of the shift registers receiving alternate clock phases. This results in each of the photodiodes receiving the clock phase periodically after the predetermined period of time for receiving light has elapsed to produce a signal indicative of the level or quantity of light received by the particular photodiode.

The output from each of the photodiodes of the array 11 is supplied to an operational amplifier 14. One suitable example of the amplifier 14, which is part of the scanner 10, is sold as model CA-10A operational amplifier by Reticon Corporation.

The output of the amplifier 14 is supplied to an integrator 15, which integrates the output signal from the amplifier 14 for a period of time. The integrator 15 is reset by a timing signal from a clock and control logic circuit 16. The clock and control logic circuit 16 also controls when the clock and counter circuit 12 of the scanner 10 produces the four clock phases supplied to the array 11 so that the integrator 15 is reset at the proper time in conjunction with these four clock phases.

The output of the integrator 15 is supplied to a sample and hold circuit 17. The time for sampling by the sample and hold circuit 17 is controlled by the clock and control logic circuit 16 supplying a sample gate to the sample and hold circuit 17 at a desired time for a predetermined period of time. One suitable example of the sample and hold circuit 17 is sold by Analog Devices, Inc., Norwood, Mass., as model SHA-2A.

The output of the sample and hold circuit 17 is supplied to an analog to digital converter (ADC) 20. One suitable example of the ADC 20 is sold as Model ADCG8B2A by Datel Systems, Inc., Canton, Mass.

The analog input from the sample and hold circuit 17 to the ADC 20 is converted by the ADC 20 to an eight bit digital output. The ADC 20 has output lines 21-28 with the lines 21-24 being connected to an adder 29 and the lines 25-28 being connected to an adder 30. The line 21 has the most significant bit with the least significant bit being on the line 28. One suitable example of each of the adders 29 and 30, which are the same, is a four-bit binary full adder sold as model SN7483 by Texas Instruments, Dallas, Tex.

Each of the output lines 21-28 of the ADC 20 is connected to a separate shift register 31. One suitable example of the shift registers 31 is a 1024-bit static shift register sold as model 2533 by Signetics Corporation, Sunnyvale, Calif.

The four shift registers 31, which are connected to the output lines 21-24 of the ADC 20, are connected through inverters 32 to the adder 29. The four shift registers 31, which are connected to the output lines 25-28 of the ADC 20, are connected through the inverters 32 to the adder 30.

Each of the inverters 32 inverts the output of the shift register 31 to which it is connected so that the adder 29 or 30 is receiving the complement of the output of the shift register 31. By adding the complement of the output of the shift register 31 to the input to the adder 29 or 30 from the ADC 20, the adder 29 or 30 performs a subtraction function.

Accordingly, the output from the adder 29 on each of its output lines 33-36 is the difference between the output from the ADC 20 on the output lines 21-24 of the ADC 20 and the output from the shift register 31 connected to the same output line of the ADC 20. Accordingly, the output of the adder 30 on each of its output lines 37-40 is the difference between the output from the ADC 20 on the output lines 25-28 of the ADC 20 and the output from the shift register 31 connected to the same output line of the ADC 20. It should be understood that the adders 29 and 30 are connected to each other by a line 40' so that any carry output from the adder 30 is supplied as a carry input to the adder 29.

Each of the shift registers 31 stores signals therein indicative of the dark scan noise level produced by each of the 1024 photodiodes of the array 11. These signals are obtained through the photodiodes of the array 11 being prevented from receiving any light for the same period of time as that to which the photodiodes of the array 11 are subjected to light. Thus, the shift registers 31 store a signal for each of the photodiodes for the dark scan noise level.

Accordingly, the eight bits from the ADC 20 are stored in the shift registers 31 in the same location in each of the shift registers 31 for each of the photodiodes. These stored signals are then supplied from the shift registers 31 through the inverters 32 to the adders 29 and 30 for the same photodiode having its signal from a light scan supplied from the ADC 20 over the output lines 21-28 of the ADC 20 to the adders 29 and 30.

Each of the shift registers 31 is controlled by signals from the clock and control circuit 16 so that each of the output signals from each of the shift registers 31 is returned to the input of the same shift register 31 by a line 41 as well as being supplied through the inverter 32 to the adder 29 or 30 during any scan cycle in which the photodiodes of the array 11 are sensing light. When a dark scan cycle is occurring in which the photodiodes of the array 11 are prevented from receiving any light so that their outputs are indicative of the dark scan noise level, then the shift registers 31 are controlled by the clock and control logic circuit 16 to receive these signals from the ADC 20 through the output lines 21-28. At this time, all of the signals from the shift registers 31 are replaced and the output signals from the shift registers 31 are not returned to their inputs by the lines 41.

The clock and control logic circuit 16 is connected by a line 42 to each of the shift registers 31 to supply a control signal to them to enable them to receive the output signals from the ADC 20 over the output lines 21-28 whenever a dark scan cycle is occurring. This also prevents the output signals from the shift registers 31 being returned to their inputs by the lines 41.

The clock and control logic circuit 16 also is connected by a line 43 to each of the shift registers 31 to supply clock signals thereto in accordance with the clock signals supplied to the photodiodes of the array 11. This insures that the shift registers 31 supply their stored signals to the adders 29 and 30 for the same photodiode as the photodiode for which the adders 29 and 30 are receiving signals from the ADC 20.

The signals on the output lines 33–36 of the adder 29 and the output lines 37–40 of the adder 30 are supplied to data latches 45 with each of the data latches 45 being connected to one of the output lines 33–40. One suitable example of the data latch is a four-bit bistable latch sold as model SN7475 by Texas Instruments.

The time at which the data latches 45 latch the data from the adders 29 and 30 is controlled by a clock signal from the clock and control logic circuit 16. This clock signal is supplied over a line 46 from the clock and control logic circuit 16 and through inverters 46A and lines 46B to the data latches 45.

Each of the data latches 45 has an output line 47 with the eight output lines 47 representing the digital data output. This digital output signal on the output lines 47 of the data latches 45 for each of the photodiodes of the array 11 has been dynamically compensated for noise due to both dark leakage current and the clock switching transients.

Figure 2A:
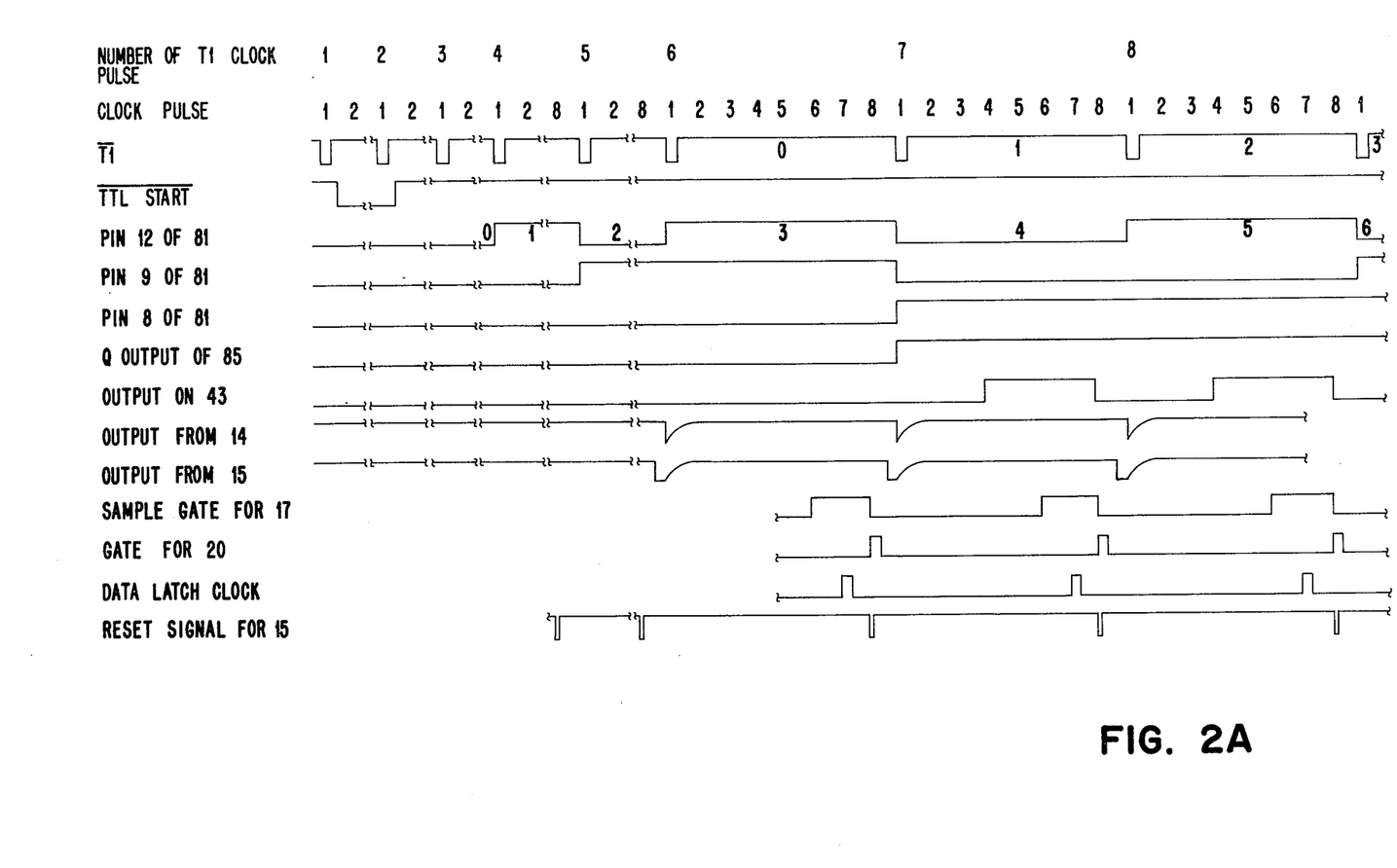
FIG. 2A is a timing diagram showing the relationship of various clock pulses at the start of a scan cycle and functions produced thereby.
Figure 2B:
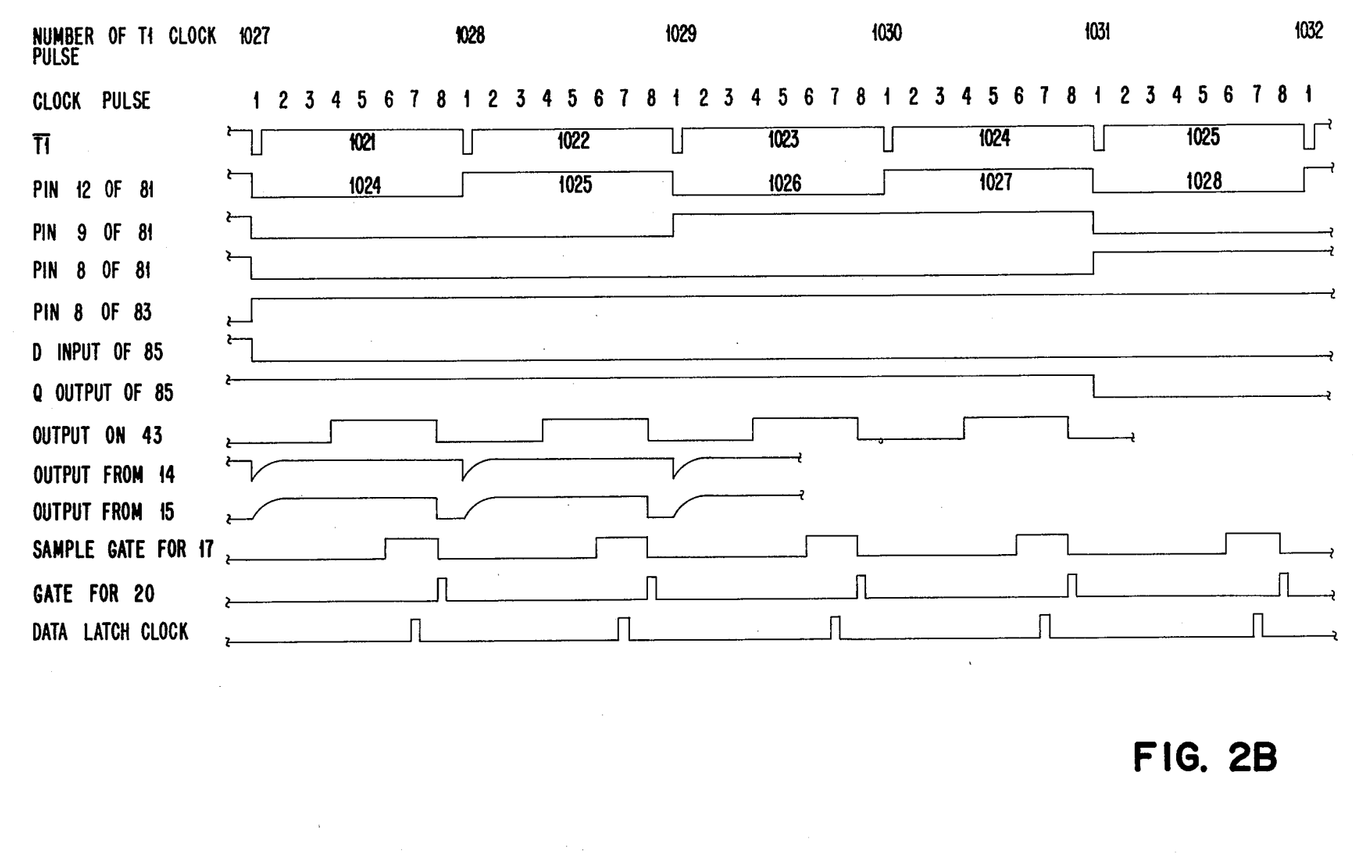
FIG. 2B is a timing diagram showing the relationship of various clock pulses at the end of a scan cycle and functions produced thereby.

As shown in the timing diagram of FIGS. 2A and 2B, the clock and control logic circuit 16 is capable of producing T1, T2, T3, T4, T5, T6, T7, and T8 clock pulses in sequence and equally spaced from each other although all are not used. The time from one of the T1 pulses to the next of the T1 pulses is the time period between any two of the four clock phases produced by the clock and counter circuit 12. That is, one of the four clock phases is produced by the clock and counter circuit 12 each time that one of the T1 clock pulses is produced.

Because the Reticon RC400 clock and counter of the clock and counter circuit 12 requires a negative going leading edge, the clock and control logic circuit 16 supplies $\overline{T1}$ clock pulses, which are produced at the same time as the T1 clock pulses but are opposite in polarity, to the clock and counter circuit 12 by a line 50 (see FIG. 1).

The $\overline{T1}$ clock pulses are supplied to a clock and counter circuit of the Reticon RC400 clock and counter of the clock and counter circuit 12. This clock and counter circuit of the Reticon RC400 clock and counter produces a $\overline{TTL\ START}$ signal, which is a negative pulse, shortly after the $\overline{T1}$ clock pulse goes positive as shown in FIG. 2A. This signal continues until shortly after the next of the $\overline{T1}$ clock pulses goes positive. At this time, the $\overline{TTL\ START}$ signal goes positive. Thus, the $\overline{TTL\ START}$ signal begins at the end of a first of the $\overline{T1}$ clock pulses and ends shortly after the end of the next $\overline{T1}$ clock pulse.

The $\overline{TTL\ START}$ signal is supplied to a four phase drive circuit of the Reticon RC400 clock and counter. Additionally, a clock pulse, which is coincident with the $\overline{T1}$ clock pulses and is produced from an oscillator of the clock and counter circuit of the Reticon RC400 clock and counter each time that one of the $\overline{T1}$ clock pulses occurs, also is supplied to the four phase drive circuit of the Reticon RC400 clock and counter. The clock and counter circuit of the Reticon RC400 clock and counter is shown in FIG. 9 of the aforesaid Reticon publication and the four phase drive circuit of the Reticon RC400 clock and counter is shown in FIG. 8 of the aforesaid Reticon publication.

The four phase drive circuit of the Reticon RC400 clock and counter produces the four clock phases for supply to the shift registers of the array 11. The first of three clock phases is produced at the time that the $\overline{TTL\ START}$ signal begins. This first of the four clock phases exists until the first $\overline{T1}$ clock pulse is produced after the $\overline{TTL\ START}$ signal has become positive. Thus, the first of the four phase clock signals to be produced from the four phase drive circuit continues until the third $\overline{T1}$ clock pulse is produced because the $\overline{TTL\ START}$ signal does not cease by going positive until after the second of the $\overline{T1}$ clock pulses has been produced. Therefore, the second of the four clock phases produced from the four phase drive circuit after the $\overline{TTL\ START}$ signal starts occurs at the end of the third $\overline{T1}$ clock pulse.

The first four clock phases from the clock and counter circuit 12 are supplied to dummy or inactive photodiodes of the array 11. That is, these first four clock phases do not produce any output signals from the scanner 10. Accordingly, the first output signal from the scanner 10 occurs in response to the sixth $\overline{T1}$ clock pulse. This is because the third of the four clock phases was produced when the fourth $\overline{T1}$ clock pulse occurred and the fourth of the four clock phases was produced when the fifth $\overline{T1}$ clock pulse occurred.

Thus, the $\overline{TTL\ START}$ signal is not produced again until at least 1029 of the T1 clock pulses have been produced even though only 1024 outputs are received from the scanner 10. Since there are no output signals from the scanner 10 for the first five of the T1 and the $\overline{T1}$ clock pulses (The first of the four clock phases of the four phase drive circuit lasts for the first two T1 and $\overline{T1}$ clock pulses.), the shift registers 31 are controlled to not receive any signals or produce any outputs for the first five T1 clock pulses, which cause the first four clock phases to be supplied from the clock and counter circuit 12 to the array 11.

The four phase drive circuit of the Reticon RC400 clock and counter also produces a START pulse, which is a low or logical zero, in response to the $\overline{TTL\ START}$ signal being supplied thereto. This START signal is supplied from the clock and counter circuit 12 to the array 11. This START signal causes the two shift registers of the array 11 to initiate a scan cycle. The START signal is supplied to each of the two shift registers of the array 11 at the same time and shifted by the four clock phases, which are supplied to the shift registers of the array 11 from the four phase drive circuit of the Reticon RC400 clock and counter of the clock and counter circuit 12. Thus, this START signal activates an FET switch for each of the photodiodes to enable the depleted charge on the capacitor, which forms a cell of the array 11 with the photodiode, to be recharged. The amount of charge required for recharging the cell indicates the level or quantity of light received by the photodiode during the predetermined period of time.

As shown in FIG. 2A, the output of the integrator 15 begins at the time that the T1 clock pulse is produced. This output signal from the photodiode, which has been connected to the amplifier 14 by the generation of one of the T1 clock pulses, of the array 11 is integrated until the T8 clock pulse starts.

The sample and hold circuit 17 (see FIG. 1) receives a gate signal over a line 53 when the T6 clock pulse is produced to start sampling of the signal in the sample and hold circuit 17. This gate signal over the line 53 remains up until the T8 clock pulse begins. Thus, sampling of the output of the integrator 15 by the sample and hold circuit 17 occurs during the time when the output of the integrator 15 is substantially constant as shown in FIG. 2A.

At the time that the gate signal to the sample and hold circuit 17 goes down, a reset signal is applied to the integrator 15 from the clock and control logic circuit 16 over a line 54 (see FIG. 1). As shown in FIG. 2A, this reset signal, which is a negative going pulse, occurs at the same time that the T8 clock pulse starts.

At the same time that the sample gate goes down, the T8 clock pulse from the clock and control logic circuit 16 is supplied over a line 55 and through an inverter 56 to the ADC 20 as a gate signal. This gate signal to the ADC 20 enables the output from the sample and hold circuit 17, which now has the sample signal held therein, to be supplied to the ADC 20.

Thus, the analog signal from the specific photodiode reaches the ADC 20 only near the completion of the cycle in which the photodiode is supplying its output to the sample and hold circuit 17 so that its supply as a digital signal to the adders 29 and 30 and the shift registers 31 occurs during the next cycle. The time for the ADC 20 to convert the analog signal from the sample and hold circuit 17 to a digital signal for supply to the adders 29 and 30 during any scan cycle and to the shift registers 31 only during a dark scan cycle requires a sufficient period of time which extends beyond the time when the photodiode is supplying its output to the integrator 15. Thus, the adders 29 and 30 during any scan cycle and the shift registers 31 during a dark scan cycle do not receive the digital signal from the ADC 20 until another of the photodiodes of the light sensor array 11 is supplying its output to the integrator 15 during the next cycle.

The clock and control logic circuit 16 supplies a positive clock signal over the line 43 to each of the shift registers 31 at the time that the T4 clock pulse starts. This clock pulse remains on the line 43 until the T8 clock pulse is produced by the control and logic circuit 16. At this time, the clock pulse, which is being supplied over the line 43 to the shift register 31, changes state to become negative to prevent the supply of any new signal from the shift registers 31 to the adders 29 and 30. As shown in FIG. 2A, the first of the clock signals over the line 43 begins with the seventh T4 clock pulse, which is when the second of the photodiodes is providing an output to the sample and hold circuit 17.

Therefore, the stored compensation signal from the shift registers 31 for the specific photodiode is present in the adders 29 and 30 at the time that conversion of the analog signal to a digital signal in the ADC 20 is completed. The conversion in the ADC 20 is normally completed after the T4 clock pulse starts.

Thus, at the time that the digital signal from the ADC 20 is produced, the adders 29 and 30 have the compensation signal from the shift registers 31 therein so that subtraction automatically occurs. This is when the next output to the integrator 15 is being supplied by another of the photodiodes in the array 11.

When the T7 clock pulse is produced by the clock and control logic circuit 16 and supplied over the line 46 to the inverters 46A and from the inverters 46A through the lines 46B to the data latches 45, the data latches 45 receive the digital signals on the output lines 33—36 of the adder 29 and the output lines 37–40 of the adder 30. These signals are latched in the data latches 45 at the time that the clock pulse T7 ceases to be produced. Therefore, the output of the prior data cycle is obtained from the latches 45 near the end of the next data cycle.

Whenever new data from the ADC 20 is to be stored in each of the shift registers 31, the shift registers 31 have a signal supplied over the line 42 from the clock and control logic circuit 16 to prevent any recirculation of the output data from each of the shift registers 31 to its inlet over the line 41. Furthermore, the shift registers 31 have the data stored therein between the time when the clock pulse T8 goes up until the clock pulse T4 starts. This is the same time as when the data is transferred from the shift register 31 to the adders 29 and 30 during any cycle in which the light sensors of the array 11 are subjected to light.

Figure 3:
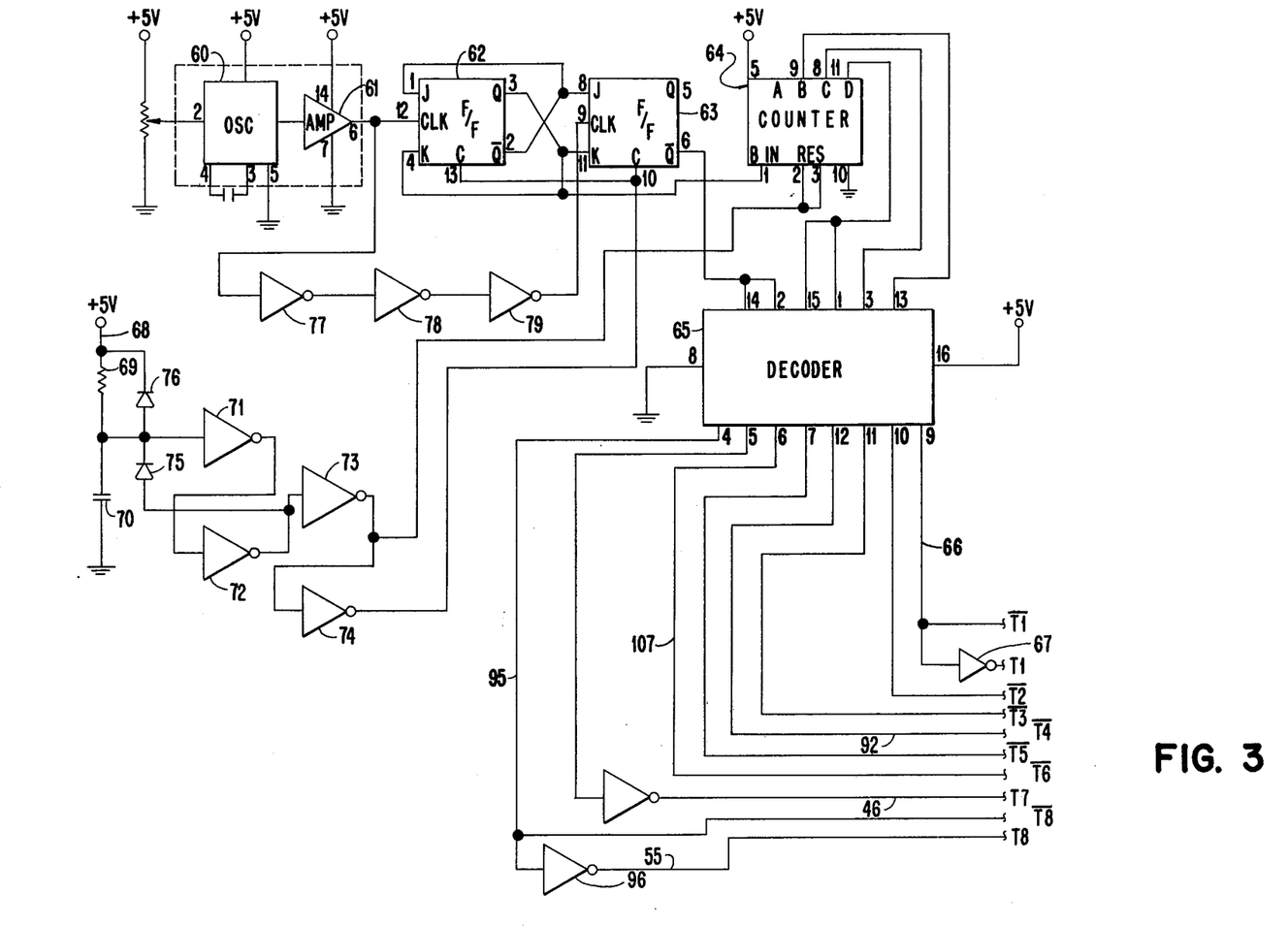
FIG. 3 is a schematic block diagram of a portion of a clock section of a clock and control logic circuit of the apparatus of FIG. 1.

Referring to FIG. 3, there is shown a portion of the clock section of the clock and control logic circuit 16. The clock section of the circuit 16 includes an oscillator 60 having its output connected through an amplifier 61 to a J-K flip-flop 62. The J-K flip-flop 62 has its $\bar{Q}$ and Q outputs connected to J and K inputs, respectively, of a J-K flip-flop 63. One suitable example of the J-K flip-flops 62 and 63 is a dual J-K master-slave flip-flop sold as model SN74107 by Texas Instruments. One suitable example of the oscillator 60 is sold by Motorola as model MC4024.

The Q output of the J-K flip-flop 62 is not only supplied to the K input of the flip-flop 63 but also to the K input of the flip-flop 62 and a counter 64. One suitable example of the counter 64 is a four-bit binary counter sold as model SN7493 by Texas Instruments. This is a four stage flip-flop with only the last three stages being used because of the Q output of the flip-flop 62 being connected to B input (pin 1) of the counter 64.

The counter 64 has its B, C, and D outputs connected to a decoder 65. One suitable example of the decoder 65 is sold as model SN74155 by Texas Instruments. When using the combination of the counter 64 and the decoder 65, the Texas Instruments' decoder has its pin 13 connected to the B output of the counter 64, its pin 3 connected to the C output of the counter 64, and its pins 1 and 15 connected to the D output of the counter 64. The decoder 65 has its pins 2 and 14 connected to the $\bar{Q}$ output of the flip-flop 63.

When the decoder 65 is Texas Instrument model SN74155 decoder, each of its output pins produces a low as its output in response to only one input. That is, pin 9 of the decoder 65 produces a low pulse at only one time with a high the remainder of the time. Accordingly, a line 66, which is connected to the pin 9 of the decoder 65, has $\overline{T1}$ as the clock pulse thereon so that the clock pulse T1 is produced only as the output of an inverter 67, which is the same as the inverters 32. Other outputs of clock pulses are indicated on various lines and produced in the same manner as the T1 and $\overline{T1}$ clock pulses.

Each of the flip-flops 62 and 63 has its clear input receive a logical zero when the power is turned on. This results in each of the flip-flops 62 and 63 being set with its Q output at a logical zero when the power is turned on.

The counter 64 has its reset pins 2 and 3 receive a logical one when the power is turned on. The logical one at the reset pins 2 and 3 of the counter 64 resets the counter 64 to a count of zero.

When the power is turned on, +5 volts is applied over a line 68 through a resistor 69 to a capacitor 70 and an inverter 71, which is connected through an inverter 72 to an inverter 73, so that the output of the inverter 73 is up when the power is turned on because of the inverters 71, 72, and 73. The logical one output of the inverter 73 is supplied to the reset pins 2 and 3 of the counter 64 to reset the counter 64 to a count of zero.

The output of an inverter 74 is down at this time and is supplied to the clear inputs of the flip-flops 62 and 63. The inverters 71–74 are the same as the inverters 32.

As the voltage of the capacitor 70 increases towards +5 volts, the input of the inverter 71 will soon reach a logical high or one whereby its output will switch to a logical low or zero. This results in the output of the inverter 72 switching to a logical high, which is coupled back to the input of the inverter 71 by a diode 75. The added current from the diode 75 rapidly charges the capacitor 70 to prevent the inverters 71 and 72 from oscillating.

When the foregoing has occurred, the output of the inverter 73 is at a logical zero and the output of the inverter 74 is at a logical one. The inverters 71–74 remain in this steady state condition until the power is turned off to remove the +5 volts from the line 68. When this occurs, the capacitor 70 discharges through a diode 76.

As the oscillator 60 oscillates, its output signals are supplied through the amplifier 61 to clock input of the flip-flop 62. The opposite signal from that supplied to the clock input of the flip-flop 62 is supplied to clock input of the flip-flop 63 through inverters 77–79.

While only one of the inverters 77–79 would be required to have the input to the clock input of the flip-flop 63 opposite from that supplied to the clock input of the flip-flop 62, the three inverters 77–79 serve to insure that the J and K inputs of the flip-flop 63 are set up before the clock input of the flip-flop 63 receives an input. One suitable example of the inverters 77–79 is sold by Texas Instruments as model SN74L04.

As previously mentioned, the $\overline{T1}$ clock pulse is supplied over the line 50 (see FIG. 1) to the clock and counter circuit 12 so that the line 66 (see FIG. 3) is connected to the line 50. The output of the inverter 67 is connected within the clock and control logic circuit 16 to an inverter 80 (see FIG. 4), which is the same as the inverters 32.

Figures 4, 5:
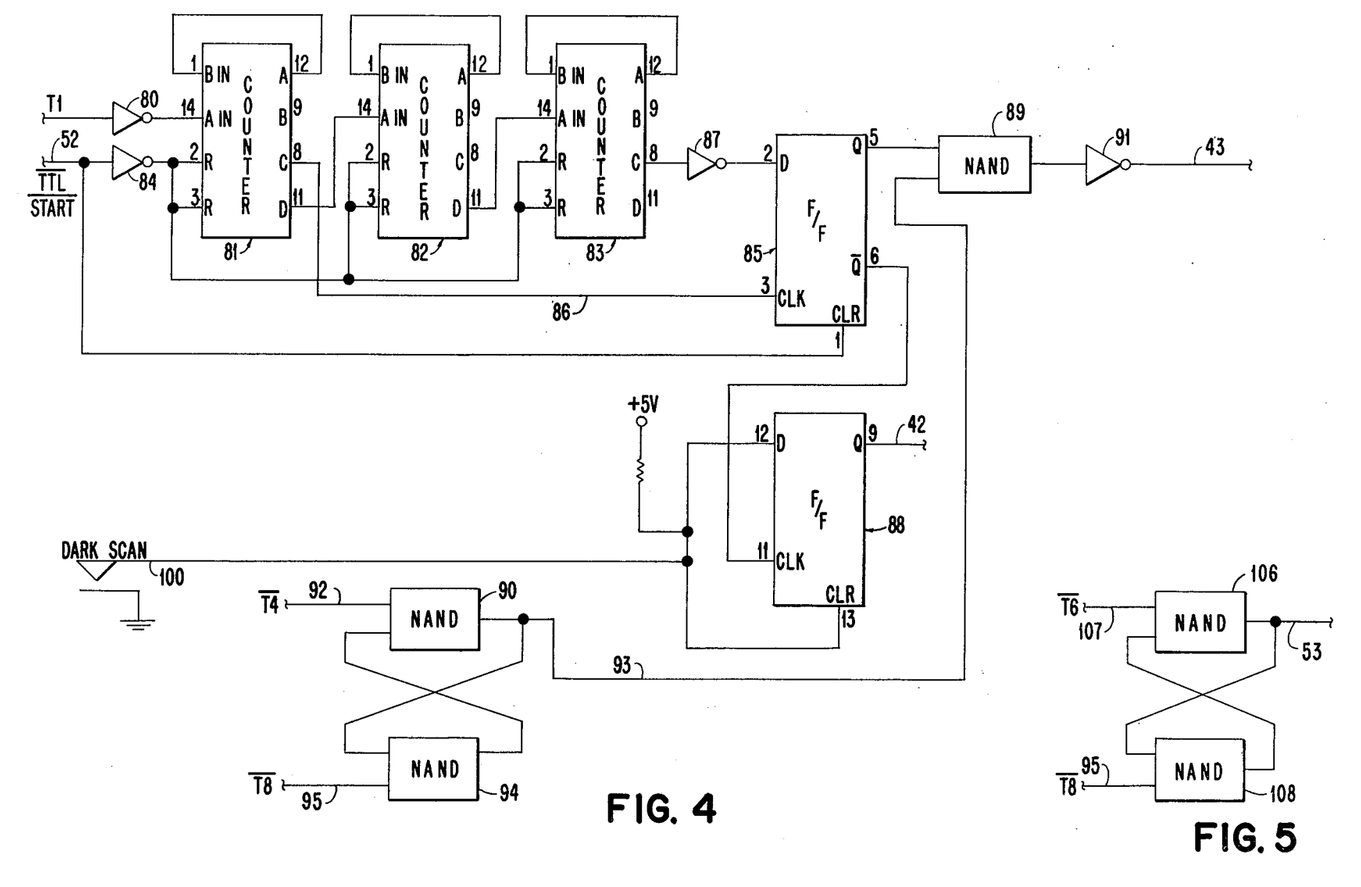
FIG. 4 is a schematic block diagram of another portion of the clock section of the clock and control logic circuit of the apparatus of FIG. 1 for producing shift register clocks and the logic signals for controlling when the shift registers store data.
FIG. 5 is a schematic block diagram of still another portion of the clock section of the clock and control logic circuit of the apparatus of FIG. 1 for producing a gate for the sample and hold circuit.

The output of the inverter 80 is connected to A input (pin 14) of a counter 81, which is sold as model SN7493 by Texas Instruments. The counter 81 has its D output (pin 11) connected to A input (pin 14) of a counter 82, which is the same as the counter 81. The counter 82 has its D output (pin 11) connected to A input (pin 14) of a counter 83, which is the same as the counters 81 and 82.

Each of the counters 81–83 has its reset pins 2 and 3 connected to the output of an inverter 84, which as a $\overline{\text{TTL START}}$ signal as its input. This input is supplied over the line 52 (see FIG. 1) from the clock and counter circuit 12. The inverter 84, which is the same as the inverters 32, supplies a high output when the $\overline{\text{TTL START}}$ signal is produced.

The $\overline{\text{TTL START}}$ signal also is supplied to a clear input of a D-type flip-flop 85 (see FIG. 4). The flip-flop 84 has its clock input connected by a line 86 to C output (pin 8) of the counter 81.

When the $\overline{\text{TTL START}}$ signal goes negative, the inverter 84 supplies a high to the reset pins 2 and 3 of each of the counters 81–83; this resets all of the outputs of each of the counters 81–83 to a logical zero. However, no counting by any of the counters 81–83 can occur until the reset pins 2 and 3 have a logical zero supplied thereto, and this can occur only when the $\overline{\text{TTL}}$ $\overline{\text{START}}$ signal goes positive. As shown in FIG. 2A, the $\overline{\text{TTL START}}$ signal goes positive shortly after the end of the second of the $\overline{T1}$ clock pulses. Therefore, the counters 81–83 (see FIG. 4) cannot begin any count until the third of the T1 clock pulses is supplied to the A input (pin 14) of the counter 81.

When the counter 81 begins to count (The count of the counter formed by the counters 81–83 is shown in FIGS. 2A and 2B as the numbers with the pulses from pin 12 (output A) of the counter 81.), its C output (pin 8) goes high the first time at the count of four where zero is the count at which the third T1 clock pulse is supplied to the A input (pin 14) of the counter 81 to start the count. Thus, the C output (pin 8) of the counter 81 goes high for the first time at the start of the seventh T1 clock pulse as shown in FIG. 2A. Thereafter, the C output of the counter 81 changes state after every fourth of the T1 clock pulses. Thus, at the start of the eleventh T1 clock pulse, the C output (pin 8) of the counter 81 goes low.

The flip-flop 85 has its D input connected to the output of an inverter 87, which has its input connected to C output of the counter 83. The inverter 87 is the same as the inverters 32.

The counter 83 produced a high on its C output (pin 8) only when 1027 of the T1 clock pulses have been supplied through the inverter 80 to the A input (pin 14) of the counter 81. Thus, the counter formed by the counters 81–83 is at count of 1024 when a low is supplied to the D input of the flip-flop 85 as shown in FIG. 2B because the count of one at the counter 81 does not occur until the fourth T1 clock pulse is supplied through the inverter 80 to the A input (pin 14) of the counter 81.

The flip-flop 85 and a flip-flop 88 are the two halves of a dual D-type edge-triggered flip-flop sold as model SN7474 by Texas Instruments. The D-type flip-flop 88 has its clock input connected to $\overline{Q}$ output of the flip-flop 85.

The flip-flop 85 has the signal at its D input transferred to the Q output only on the positive edge of a clock pulse at the clock input of the flip-flop 85 from the line 86. When this transfer has been completed, the flip-flop 85 has the same signal on its Q output as on its D input with the $\overline{Q}$ output being the opposite.

The supply of the $\overline{\text{TTL START}}$ signal, which is a logical zero, to the clear input of the flip-flop 85 causes its Q output to have a low or logical zero as its output. Therefore, at the end of the first of the T1 clock pulses of a scan cycle, the Q output of the flip-flop 85 is a low while the D input of the flip-flop 85 is a high. This high at the D input of the flip-flop 85 cannot be transferred to the Q output of the flip-flop 85 until the seventh of the T1 clock pulses occurs because this is when the C output (pin 8) of the counter 81 produces its first high on the line 86 with a high being produced on the line 86 every eight of the T1 clock pulses thereafter. Thus, it is only when the sixth output from the scanner 10 (This is due to the seventh of the $\overline{T1}$ clock pulses.) is occurring that the Q output has a high to provide signals for supply to the shift registers 31 over the line 43.

Since the first four photodiodes of the array 11 are dummies or inactive, as previously mentioned, it is not desired to have any information stored or removed from the shift registers 31 during the first four cycles of output from the scanner 10. Because the shift registers 31 only receive the output from the photodiodes of the array 11 of the scanner 10 after the signal has been converted by the ADC 20 and this extends into the next cycle (The numbers with the $\overline{T1}$ clock pulses in FIGS.

2A and 2B identify the cycle in which the ADC 20 produces outputs so that 1 with the $\overline{T1}$ clock pulse in FIG. 2A is the first cycle in which the ADC 20 produces an output.), the shift registers 31 initially receive information, which has been produced during the fifth output cycle from the array 11 of the scanner 10, during the sixth output cycle from the array 11 of the scanner 10. Thus, the counting arrangement of FIG. 4 accomplishes this.

As previously mentioned, a low is supplied to the D input of the flip-flop 85 upon 1027 of the T1 clock pulses being produced. However, this low at the D input of the flip-flop 85 is not transferred to the Q output of the flip-flop 85 at this time because the transfer occurs on the leading edge of the clock pulse at the clock input of the flip-flop 85. Therefore, four more of the T1 clock pulses must occur before the low of the D input is transferred to the Q output for the flip-flop 85. This is when 1031 of the T1 clock pulses have been produced. Accordingly, the Q output of the flip-flop 85 is high from the time that the seventh T1 clock pulse starts (see FIG. 2A) until the start of the 1031st T1 clock pulse (see FIG. 2B).

This enables the Q output of the flip-flop 85 to be high for 1024 data cycles of the scan. This is the number of the photodiodes of the array 11 which have been sampled and have their information stored in the shift registers 31 during a dark scan cycle.

The Q output of the flip-flop 85 is connected as one input to a NAND gate 89. One suitable example of the NAND gate 89 is sold as model SN7400 by Texas Instruments.

The NAND gate 89 has the output of a NAND gate 90, which is the same as the NAND gate 89, as its other input. The NAND gate 89 produces a high as its output except when its two inputs are high. The output of the NAND gate 89 is inverted by an inverter 91, which is the same as the inverters 32, with the output of the inverter 91 connected to the line 43.

The NAND gate 90 has one input connected by a line 92 to output pin 12 of the decoder 65 (see FIG. 3) on which the $\overline{T4}$ clock pulse is produced. The $\overline{T4}$ clock pulse goes low at the time when the T4 clock pulse goes high although the T4 clock pulse is not used. This low input to the NAND gate 90 on the line 92 causes a high to appear on the output of the NAND gate 90, and this high is transmitted to the other input of the NAND gate 89 by a line 93.

The output of the NAND gate 90 also is one of two inputs to a NAND gate 94, which has its output connected as the other input to the NAND gate 90 and is the same as the NAND gate 89. The other input to the NAND gate 94 is over a line 95 from output pin 4 of the decoder 65 (see FIG. 3) on which the $\overline{T8}$ clock pulse is produced. The $\overline{T8}$ clock pulse goes low when the T8 clock pulse, which is produced on the line 55 through an inverter 96 having its input connected to the line 95, goes high. The inverter 96 is the same as the inverters 32.

At the time that the output of the NAND gate 90 goes high due to the $\overline{T4}$ clock pulse going low, this produces a high as one of the inputs to the NAND gate 94. Since the $\overline{T8}$ clock pulse is high at this time, there are two high inputs to the NAND gate 94 so that its output becomes a low.

Since the output of the NAND gate 94 is connected as the other input to the NAND gate 90, the changing of the state of the output of the NAND gate 94 to a low results in the output of the NAND gate 90 remaining at a high after the $\overline{T4}$ clock pulse becomes high. The $\overline{T4}$ clock pulse becomes high when the T4 clock pulse goes low.

Therefore, the NAND gate 90 continues to supply a high on the line 93 as a second input to the NAND gate 89 until the $\overline{T8}$ clock pulse goes low. This low input over the line 95 to the NAND gate 94 causes the output of the NAND gate 94 to go high. Accordingly, the input of this high output of the NAND gate 94 to the NAND gate 90 results in the output of the NAND gate 90 going low since both of its inputs are now high. That is, the $\overline{T4}$ clock pulse has been high ever since the T4 clock pulse went low.

When the output of the NAND gate 90 goes low, this low is supplied as an input to the NAND gate 94. This low maintains the output of the NAND gate 94 at a high even after the $\overline{T8}$ clock pulse goes high upon the T8 clock pulse going low.

Therefore, the NAND gates 90 and 94 cooperate to cause a high to be supplied over the line 93 to the NAND gate 89 from the time that the T4 clock pulse goes high until the T8 clock pulse goes high. since the other input to the NAND gate 89 stays high from the start of the seventh of the T1 clock pulses until the start of the 1031st T1 clock pulse, there are 1024 low outputs supplied from the NAND gate 89 with each occurring between the time that the T4 clock pulse starts until the T8 clock pulse starts.

Each of these low outputs from the NAND gate 89 is inverted by the inverter 91 so that a high is supplied over the line 43 to each of the shift registers 31. Thus, each of the shift registers 31 receives a high as a clock input over the line 43 from the time that the T4 clock pulse starts until the time that the T8 clock pulse starts.

This high clock input at the shift registers 31 enables each of the shift registers 31 so that one bit in each of the shift registers 31 is transferred as an output to the adders 29 and 30. The enabling of the shift registers 31 by the high clock input also causes each to be capable of receiving data from the ADC 20 during a dark scan cycle. Thus, the high clock input at each of the shift registers 31 results in transfer of any new data from the ADC 20 into the shift registers 31 during a dark scan cycle while also causing an output from each of the shift registers 31 during a light scan cycle.

If the shift registers 31 are to transfer information therefrom to the adders 29 and 30 and recirculate the information over the lines 41 as the inputs to the shift registers 31 during a light scan cycle, then a high or logical one is supplied over the line 42 to each of the shift registers 31 from the clock and control logic circuit 16. If the shift registers 31 are to store information therein from the ADC 20 and this is during a dark scan cycle, then the clock and control circuit 16 must supply a low or logical zero over the line 42 to each of the shift registers 31. When there is a low or logical zero on the line 42, each of the shift registers 31 stores the digital bit from the ADC 20 and does not have its output recirculated by the line 41 to its input.

As previously mentioned, the shift registers 31 store the digital information from the ADC 20 when a dark scan cycle occurs. That is, the photodiodes of the array 11 are prevented from receiving any light for the same predetermined period of time as that to which they are exposed to light during a light scan cycle.

The flip-flop 88 of the clock and control logic circuit 16 (see FIG. 4) has a low supplied to its D input and its clear input whenever a dark scan cycle is to occur. This is accomplished by closing a switch 100 for a very short period of time but sufficient to supply the logical zero to the D input and the clear input of the flip-flop 88. Instead of using the switch 100, a signal from the machine logic could be supplied.

When the clear input to the flip-flop 88 is a low, its Q output is changed to a low or logical zero. The low Q output of the flip-flop 88 remains at a logical zero until the D input, which has become high upon the switch 100 being opened, of the flip-flop 88 is transferred to the Q output by a positive going pulse at the clock input of the flip-flop 88. This occurs at the end of a dark scan cycle when the $\overline{Q}$ output of the flip-flop 85 goes high.

The presence of a low or logical zero on the line 42 prevents any recirculation of the data from the output of the shift registers 31. It should be understood that this is directed to a 1024 bit static shift register sold as model 2533 by Signetics.

Figure 7:
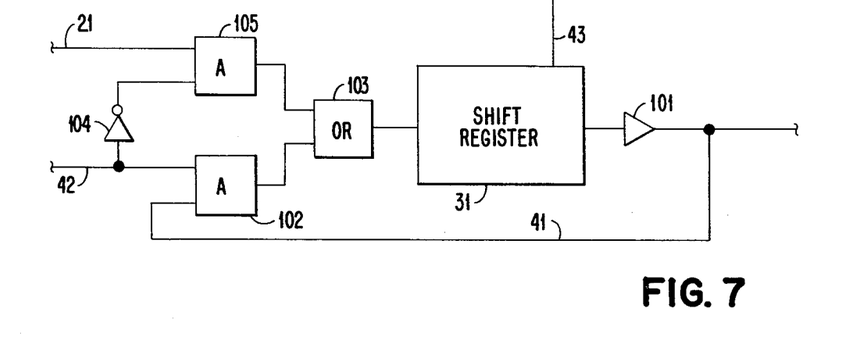
FIG. 7 is a schematic diagram of one of the shift registers for storing the compensation signal and its circuit.

The Signetics circuit for the model 2533 static shift register is shown in FIG. 7. The shift register 31 has an amplifier 101 connected to its output prior to the line 41, which connects the output of the shift register 31 as one of two inputs to an AND gate 102. The other of the inputs to the AND gate 102 is the line 42. Thus, as long as the line 42 has a high thereon, any logical ones or highs from the output of the shift register 31 are supplied through the AND gate 102 and an OR gate 103 as an input to the shift register 31.

However, when the line 42 has a low or logical zero thereon, the AND gate 102 always has a low as its output. This prevents any logical ones from the output of the shift register 31 from being returned by the line 41 as an input to the shift register 31.

When the line 42 has a logical zero thereon, it is supplied through an inverter 104 and becomes a high as one input to an AND gate 105. The other input to the AND gate 105 is one of the output lines 21-28 of the ADC 20 depending on the shift register 31. As shown in FIG. 7, the output line 21 of the ADC 20 is the other input line to the AND gate 105. Thus, when the output line 21 of the ADC 20 is high, this logical one is supplied through the AND gate 105 and the OR gate 103 to the shift register 31 as the high input.

When the shift register 31 is not to receive data bits from the ADC 20, the line 42 has a logical one thereon. At this time, the inverter 104 causes a logical zero to be supplied to the AND gate 105 whereby its output is always low irrespective of the signal on the output line 21 of the ADC 20.

Accordingly, the presence of a logical zero on the line 42 prevents any recirculation of the data from the output of the shift register 31 through the line 41 to its input. This is during any dark scan cycle when new data is to be supplied to the shift register 31 for storage therein. At all other times, the line 42 has a high or logical one thereon so that the output of the shift register 31 is recirculated to its input by the line 41.

The output signal on the line 42 also is utilized with the shift registers 31 to enable the data from the ADC 20 to be inserted in the shift registers 31. The clock pulses, which are supplied over the line 43 to each of the shift registers 31, govern when each of the data bits from each of the output lines 21-28 of the ADC 20 is supplied to each of the shift registers 31.

Thus, the data from the ADC 20 is supplied to the shift registers 31 between the time that the T4 clock pulse goes high and the time that the T8 clock pulse starts since this is when the line 43 is high. During the same time, each of the shift registers 31 produces an output. The bit, which is removed from the shift register 31 as its output, is then supplied to the adders 29 and 30 and either recirculated to the shift register 31 or is not recirculated. Even though the bit is not recirculated to the shift register 31 by the line 41, the bit from each of the shift registers 31 is supplied to the adder 29 or 30. However, this is during a dark scan cycle, and it is not used for a signal. It should be understood that a bit is removed from the shift register 31 during either receipt of new data in a dark scan cycle or during transfer of the data bit to the adders 29 and 30 during a light scan cycle.

When a dark scan cycle is completed, the $\overline{Q}$ output of the flip-flop 85 (see FIG. 4) goes high as in a light scan cycle. Thus, the high at the D input of the flip-flop 88 is transferred to the Q output of the flip-flop 88. As a result, a logical one is on the line 42 at the end of the dark scan cycle. This enables recirculation of the data from the output of each of the shift registers 31 to its input by the line 41 during any light scan cycle.

As previously mentioned, the sample and hold circuit 17 has a sample gate supplied thereto over the line 53 from the time that the T6 clock pulse starts until the T8 clock pulse starts. The sample gate is supplied over the line 53 from the circuit of FIG. 5.

A NAND gate 106, which is the same as the NAND gate 89, has the line 53 connected to its output. The NAND gate 106 has one input connected by a line 107 to output pin 6 of the decoder 65 (see FIG. 3) on which the $\overline{T6}$ clock pulse is produced. The $\overline{T6}$ clock pulse goes low at the time when the T6 clock pulse goes high although the T6 clock pulse is not used. This low input to the NAND gate 106 (see FIG. 5) on the line 107 causes a high to appear on the output of the NAND gate 106, and this high, which is the sample gate, is transmitted to the sample and hold circuit 17 by the line 53.

The output of the NAND gate 106 also is one of two inputs to a NAND gate 108, which has its output connected as the other input to the NAND gate 106 and is the same as the NAND gate 89. The other input to the NAND gate 108 by the line 95 is from the output pin 4 of the decoder 65 (see FIG. 3) on which the $\overline{T8}$ clock pulse is produced. The $\overline{T8}$ clock pulse goes low when the T8 clock pulse goes high.

At the time that the output of the NAND gate 106 goes high due to the $\overline{T6}$ clock pulse going low, this produces a high as one of the inputs to the NAND gate 108. Since the $\overline{T8}$ clock pulse is high at this time, there are two high inputs to the NAND gate 108 so that its output becomes a low.

Since the output of the NAND gate 108 is connected as the other input to the NAND gate 106, the changing of the state of the output of the NAND gate 108 to a low results in the output of the NAND gate 106 remaining at a high after the $\overline{T6}$ clock pulse becomes high. The $\overline{T6}$ clock pulse becomes high when the T6 clock pulse goes low.

Therefore, the NAND gate 106 continues to supply a high, which is the sample gate, on the line 53 to the sample and hold circuit 17 until the $\overline{T8}$ clock pulse goes low. This low input to the NAND gate 108 causes the output of the NAND gate 108 to go high. Accordingly, the input of this high output of the NAND gate 108 to the NAND gate 106 results in the output of the NAND gate 106 going low since both of its inputs are now high.

That is, the $\overline{T6}$ clock pulse has been high ever since the T6 clock pulse went low.

When the output of the NAND gate 106 goes low, this ends the sample gate to the sample and hold circuit 17. This low from the NAND gate 106 maintains the output of the NAND gate 108 at a high even after the $\overline{T8}$ clock pulse goes high upon the T8 clock pulse going low.

Therefore, the NAND gates 106 and 108 cooperate to cause a high, which is the sample gate, to be supplied over the line 53 to the sample and hold circuit 17 from the time that the T6 clock pulse goes high until the T8 clock pulse goes high. Thus, the circuit of FIG. 5 controls the length of the sample gate for the sample and hold circuit 17.

Figure 6:
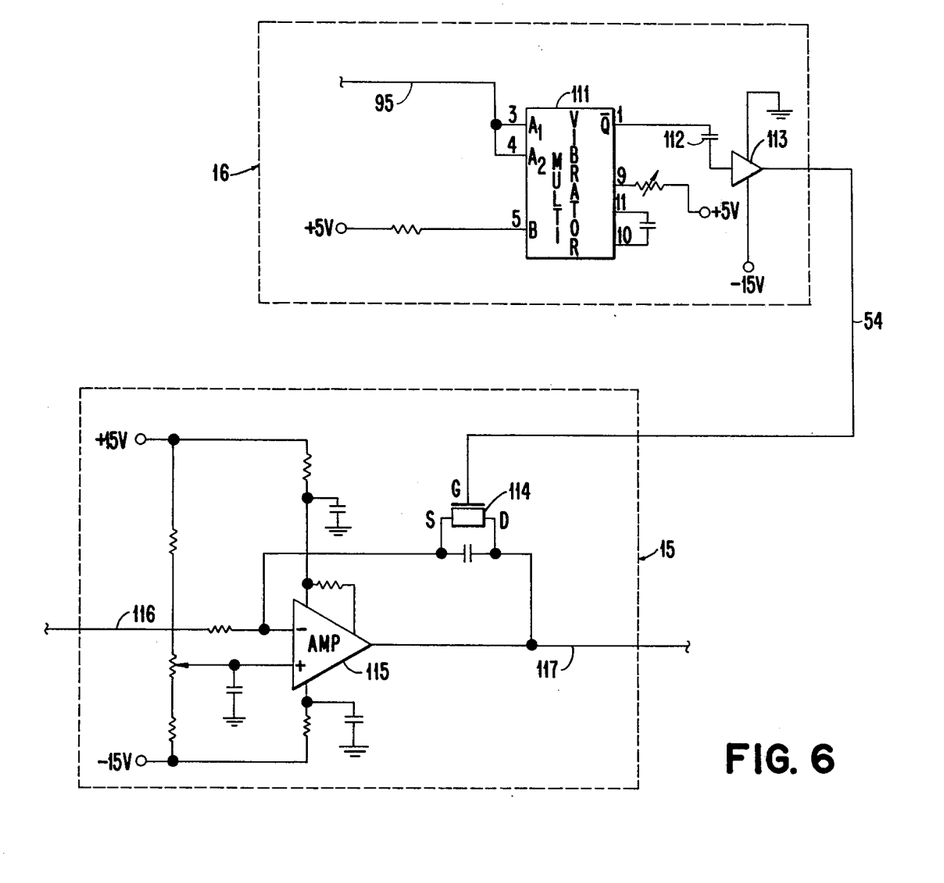
FIG. 6 is a schematic block diagram of the integrator and the circuit for resetting the integrator.

As previously mentioned, the integrator 15 is reset at the time that the T8 clock pulse goes up by a negative going pulse being supplied from the clock and control logic circuit 16 over the line 54. As shown in FIG. 6, the clock and control logic circuit 16 includes a monostable vibrator 111 having a $\overline{T8}$ clock pulse applied thereto over the line 95. One suitable example of the monostable multivibrator 111 is sold as model SN74121 by Texas Instruments.

The line 95 is connected to inputs A1 and A2 of the multivibrator 111. The multivibrator 111 has +5 volts supplied to its B input.

The multivibrator 111 has its $\overline{Q}$ output connected through a capacitor 112, a clock driver 113, and the line 54 to the gate of FET 114. One suitable example of the clock driver 113 is sold as model 0026 by Motorola. One suitable example of the FET 114 is sold by Texas Instruments as model 2n5555. The capacitor 112 and the clock driver 113 are part of the clock and control logic circuit 16.

The FET 114 functions as a switch through having its source connected to a negative input of an operational amplifier 115 of the integrator 15 with the same input of the operational amplifier 115 of the integrator 15 connected to the output of the amplifier 14 of the array 11 through a line 116. One suitable example of the operational amplifier 115 is an operational amplifier sold as model 3400B by Burr-Brown Research Corporation, Tucson, Ari.

The FET 114 is closed for a relatively short period of time to enable the operational amplifier 115 of the integrator 15 to return to ground. The $\overline{Q}$ output of the multivibrator 111 provides a negative pulse for a very short period of time so that it functions as a single shot. This negative pulse results in the FET 114 closing for the short period of time in which the operational amplifier 115 of the integrator 15 is reset to ground to receive the output of the next of the photodiodes of the array 11 from the amplifier 14. The operational amplifier 115 of the integrator 15 has its output connected by a line 117 to the sample and hold circuit 17.

Considering the operation of the present invention, the compensation signal for the dark scan noise level is first obtained. This is accomplished through momentarily closing the switch 100 (see FIG. 4) to cause a logical zero to be supplied from the Q output of the flip-flop 88 by the line 42 to each of the shift registers 31. This prevents any recirculation of the data bits from the output of the shift registers 31 to their inputs.

At the same time, the T1 clock pulses are generated from the decoder 65 (see FIG. 3) of the clock and control logic circuit 16 (see FIG. 1). The T1 clock pulses from the decoder 65 are supplied by the line 50 to the clock and counter board circuit 12. This causes the START signal to be supplied to the two shift registers of the array 11. As each of the T1 clock pulses is produced, it causes the shifting of the START signal in the shift register of the array 11 so that each of the photodiodes is sampled for a predetermined period of time, which is the time period between the T1 clock pulses.

When the sixth T1 clock pulse is produced, the first of the 1024 diodes starts to supply its output to the integrator 15 as shown in FIG. 2A. As previously mentioned, the second of the first four clock phases is not produced until the third of the T1 clock pulses is produced because of the $\overline{TTL\ START}$ signal extending until shortly after the end of the second T1 clock pulse as shown in FIG. 2A. The integrator 15 is reset by the T8 clock pulse of the prior data cycle, which is the cycle in which the fourth of the dummy photodiodes of the array 11 receives signals. Thus, the integrator 15 is ready to begin integration as soon as an output starts to be received via the amplifier 14 from the first of the 1024 photodiodes of the array 11.

When the sixth of the T6 clock pulses is produced, the sample and hold circuit 17 begins to sample the output of the integrator 15 since the sample gate is supplied from the clock and control logic circuit 16 over the line 53 to the sample and hold circuit 17 at this time. When the sample gate to the sample and hold circuit 17 goes down at the start of the sixth of the T8 clock pulses, sampling of the output of the integrator 15 by the sample and hold circuit 17 ceases.

This sampled signal is then held by the sample and hold circuit 17 for supply to the ADC 20. The ADC 20 begins to convert the output of the sample and hold circuit 17 at the start of the sixth T8 clock pulse, which is supplied over the line 55 to the ADC 20 from the clock and control logic circuit 16.

The time for the ADC 20 to convert the analog input from the sample and hold circuit 17 to a digital output extends into the data cycle started by the seventh T1 clock pulse. When the seventh T1 clock pulse starts, the Q output of the flip-flop 85 (see FIG. 4) changes state, as shown in FIG. 2A, to become a high input to the NAND gate 89 (see FIG. 4). Thus, when the seventh T4 clock pulse starts, a logical one occurs on the line 43 as a clock pulse to the shift registers 31. This logical one continues until the seventh T8 clock pulse occurs.

Accordingly, data is transferred from the output lines 21-28 of the ADC 20 to the shift registers 31 at the time that the seventh T4 clock pulse starts. Therefore, the data bit in each of the shift registers 31 is stored during the cycle after that in which the output of the photodiode of the array 11 is integrated by the integrator 15 and received by the sample and hold circuit 17. The first cycle of storing the data bits in the shift registers 31 is identified by 1 with the $\overline{T1}$ clock pulses in FIG. 2A.

At the start of the 1029th T1 clock pulse, the last of the 1024 photodiodes of the array 11 begins to supply its output to the integrator 15. The output of the integrator 15 is sampled by the sample and hold circuit 17 during the same data cycle with the ADC 20 receiving the clock pulse T8 over the line 55 from the clock and control logic circuit 16 during this same cycle whereby conversion starts. However, as previously mentioned, conversion extends into the next data cycle. Thus, since the logical zero to the D input of the flip-flop 85 (see FIG. 4) occurred at the start of the 1027th T1 clock pulse (see FIG. 2B), four more of the T1 clock pulses must occur before this logical zero is transferred from the D input of the flip-flop 85 to the Q output of the flip-flop. Therefore, the Q output of the flip-flop 85 stays up until the start of the 1031st T1 clock pulse because the input from the C output (pin 8) of the counter 81 (see FIG. 4) to the clock input of the flip-flop 85 changes state every fourth data cycle and goes high when the 1031st T1 clock pulse starts.

Accordingly, the output from the integrator 15 for the last of the 1024 photodiodes of the array 11 is supplied to each of the shift registers 31 at the start of the 1030th T4 clock pulse. The high on the line 43 ceases at the start of the 1030th T8 clock pulse to stop supply of data to the shift registers 31 from the ADC 20. When the 1031st T1 clock pulse begins, the Q output of the flip-flop 85 goes low to prevent any further change in signals on the line 43. Thus, the line 43 has a logical zero at this time; this logical zero remains on the line 43 until the seventh T4 clock pulse of a light scan cycle occurs.

A light scan cycle can occur at the production of any T1 clock pulse after his 1031st T1 clock pulse of the dark scan cycle has occurred. The clock and counter circuit of the Reticon RC400 clock and counter can have a counter set to a number greater than 1031 to cause another of the $\overline{\text{TTL START}}$ signals to be produced by one of the T1 clock pulses. This can occur for any T1 clock pulse after 1031 of the T1 clock pulses have been produced during a dark scan cycle.

During a light scan cycle, the same sequence as during a dark scan cycle happens except that the output on the line 42 remains at a logical one. The output on the line 42 will never change state again until the dark scan switch 100 (see FIG. 4) is momentarily closed.

Therefore, with the line 42 (see FIG. 1) having a logical one thereon, each of the shift registers 31 recirculates its output to its input by the line 41. Accordingly, none of the data from the ADC 20 can be supplied to the shift registers 31 but are supplied only to the adders 29 and 30. During a light scan, the ADC 20 is producing an output indicating the level or quantity of light received by the photodiode of the array 11 for the predetermined period of time.

Furthermore, at the time that the line 43 has a high thereon, the shift registers 31 supply the output to either the adder 29 or 30 depending on which has the particular shift register 31 connected thereto.

As discussed for the dark scan cycle, the seventh T4 clock pulse causes the line 43 to have a high thereon for the first time as shown in FIG. 2A. This results in the output of each of the shift registers 31 being supplied to the adder 29 or 30 to which it is connected. The shift registers 31 do not receive the output from the ADC 20 at this time because of the high on the line 42, but have their outputs recirculated to their inputs over the lines 41.

The output from the first of the 1024 photodiodes of the array 11 is integrated during the data cycle, which began with the sixth T1 clock pulse. This integrated output, which is sampled by the sample and hold circuit 17, has its conversion start with the supply of the sixth T8 clock pulse from the clock and control logic circuit 16 to the ADC 20 as a gate signal. The ADC 20 supplies an output during the first time that a high (This is started by the seventh T4 clock pulse.) is on the line 43 and prior to the seventh T7 clock pulse. This first output of the ADC 20 occurs in the cycle identified by 1 with the $\overline{\text{T1}}$ clock pulses in FIG. 2A.

The production of the seventh T7 clock pulse latches the outputs of the adders 29 and 30 in the data latches 45. Thus, latching of the outputs of the adders 29 and 30 in the data latches 45 is completed at the end of the seventh T7 clock pulse, and this is prior to the high on the line 43 ceasing at the start of the seventh T8 clock pulse.

Therefore, each of the shift registers 31 supplies the compensation signal for each of the photodiodes of the array 11 to the adders 29 and 30 in the same order as the adders 29 and 30 receive the outputs of the photodiodes of the array 11 during a light scan cycle.

The output of the last of the 1024 photodiodes of the array 11 is supplied from the ADC 20 during the cycle, which begins with the 1030th T1 clock pulse. This is identified as 1024 with the $\overline{\text{T1}}$ clock pulses in FIG. 2B. When the 1030th T7 clock pulse is produced, the output from the adders 29 and 30 for the last of the 1024 photodiodes is latched in the data latches 45. The output of the adders 29 and 30 for each of the photodiodes of the array 11 is the level of the light less the compensated signal for the dark scan noise level.

Light scan cycles can continue as desired with each occurring at the same frequency as that between the dark scan cycle and the first light scan cycle. Whenever another dark scan cycle is desired, the switch 100 (see FIG. 4) is momentarily closed. This should occur after completion of a light scan cycle.

Figure 8:
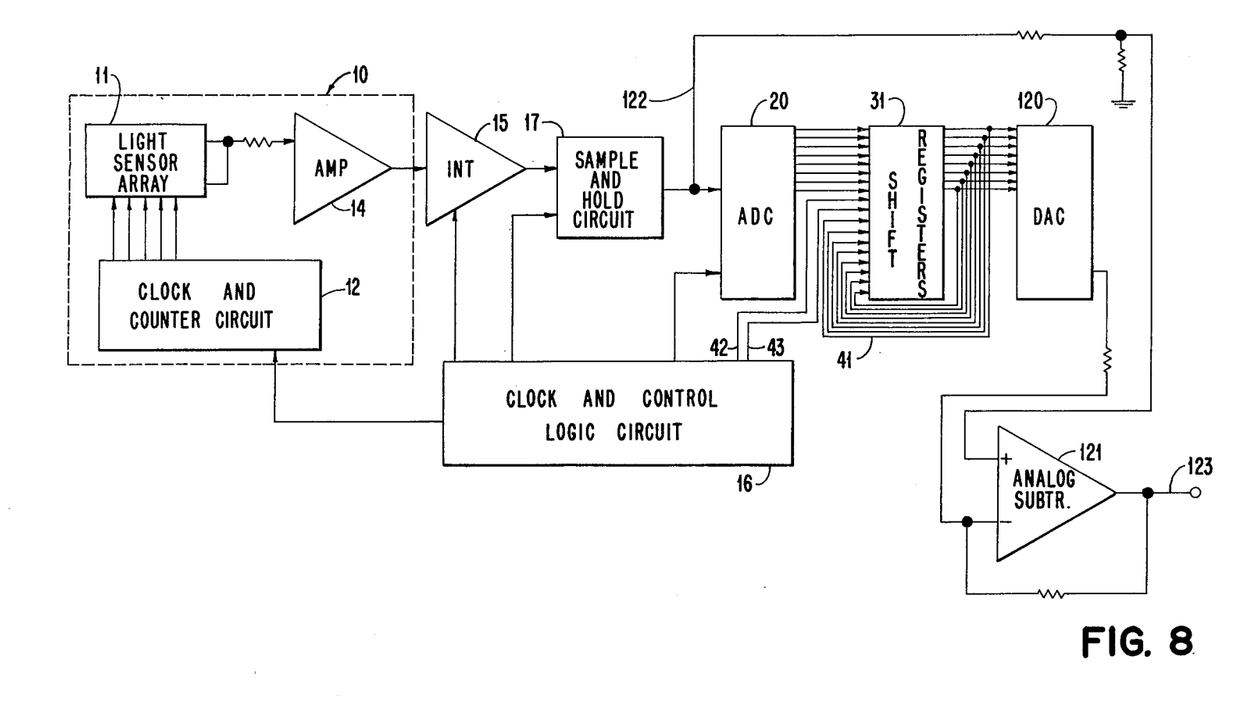
FIG. 8 is a schematic block diagram of another embodiment of the present invention for dynamically compensating individual light sensors arranged in an array for dark scan noise.

Referring to FIG. 8, there is shown another embodiment of the present invention in which some of the same elements are used as employed in FIG. 1 and are identified by the same reference numerals in this view. In this modification, the outputs of the shift registers 31 are converted to analog signals by a digital to analog converter (DAC) 120. One suitable example of the DAC 120 is sold as model DAC 12Q7 by Analog Devices, Inc.

The analog output of the DAC 120 contains the compensation signal for the dark scan noise level. This is supplied as an input to the negative input of an analog subtractor 121. One suitable example of the analog subtractor 121 is the operational amplifier sold as model 3400B by Burr Brown Research Corporation and connected to function as an analog subtractor.

The analog subtractor 121 has the output of the sample and hold circuit 17 supplied to its positive input by a line 122. Thus, output line 123 of the subtractor 121 has the output of the diode of the array 11 less the compensation signal for the dark scan noise level from the shift registers 31 as the output.

The shift registers 31 are controlled from the clock and control logic circuit 16 to enable the DAC 120 to supply its output, which is the compensation signal for the dark scan noise level, to the subtractor 121 so that it is present when the output from the sample and hold circuit 17 for the same photodiode of the array 11 is supplied over the line 122 to the subtractor 121. The shift registers 31 obtain the data, which is stored therein, during a dark scan cycle in the same manner as previously described for the embodiment of FIG. 1.

An advantage of this invention is that it enables a true comparative output from each light sensor sensing the quantity or level of light for various portions of a document. Another advantage of this invention is that compensation for the dark scan noise level is dynamically made.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for providing a compensation for dark scan noise level for each of a plurality of individual light sensors arranged in a predetermined relation including:

means to produce a separate output signal from each of the individual light sensors in accordance with the level of light received by each of the individual light sensors;

said producing means producing a separate compensation signal for dark scan noise level from each of the individual light sensors when the individual light sensors are prevented from being subjected to light;

storage means for receiving and storing the separate compensation signal from said producing means for each of the light sensors to compensate for the dark scan noise level affecting the accuracy of the separate output signal of the same light sensor from said producing means;

means to connect said producing means to said storage means only when the individual light sensors are prevented from being subjected to light;

subtracting means to subtract the separate compensation signal from said storage means from the output signal of the same light sensor from said producing means to produce a signal compensated for the dark scan noise level;

and means to supply all of the separate output signals from said producing means to said subtracting means.

2. The apparatus according to claim 1 including:

means to convert each of the separate compensation signals from said producing means into a digital signal prior to supply to said storage means and each of the output signals from said producing means into a digital signal prior to said subtracting means.

3. The apparatus according to claim 2 in which:

said producing means produces the separate output signals in serial fashion;

said storage means includes shift register means;

said producing means supplies the separate compensation signals to said shift register means from the individual light sensors in serial fashion when the individual light sensors are prevented from being subjected to light;

means to recirculate each of the separate compensation signals to said shift register means during supply of the same separate compensation signal to said subtracting means;

and means to prevent recirculation of any of the separate compensation signals to said shift register means during the supply of the separate compensation signals from said producing means to said shift register means.

4. The apparatus according to claim 2 in which said producing means produces the separate output signals in serial fashion.

5. The apparatus according to claim 1 including:

means to convert each of the separate compensation signals from said producing means into a digital signal prior to supply to said storage means;

and means to convert each of the separate compensating signals from said storage means into an analog signal prior to supply to said subtracting means.

6. The apparatus according to claim 5 in which:

said producing means produces the separate output signals in serial fashion;

said storage means includes shift register means;

said producing means supplies the separate compensation signals to said shift register means from the individual light sensors in serial fashion when the individual light sensors are prevented from being subjected to light;

means to recirculate each of the separate compensation signals to said shift register means during supply of the same separate compensation signal to said subtracting means;

and means to prevent recirculation of any of the separate compensation signals to said shift register means during the supply of the separate compensation signals from said producing means to said shift register means.

7. The apparatus according to claim 1 in which said producing means produces the separate output signals in serial fashion.

* * * * *